US012494563B2

(12) United States Patent
Chiang et al.

(10) Patent No.: US 12,494,563 B2
(45) Date of Patent: Dec. 9, 2025

(54) COMBINED STREETLIGHT

(71) Applicant: Agileiots Investment Co., Ltd., Taoyuan (TW)

(72) Inventors: Hung-Hsiang Chiang, Kaohsiung (TW); Chia-Chen Lin, New Taipei (TW); Tsung-Hsun Kuo, New Taipei (TW); Kai-Yuan Kuo, Taipei (TW)

(73) Assignee: AGILEIOTS INVESTMENT CO., LTD., Taoyuan (TW)

( * ) Notice: Subject to any disclaimer, the term of this patent is extended or adjusted under 35 U.S.C. 154(b) by 323 days.

(21) Appl. No.: 18/229,517

(22) Filed: Aug. 2, 2023

(65) Prior Publication Data

US 2024/0047866 A1 Feb. 8, 2024

(30) Foreign Application Priority Data

Aug. 3, 2022 (TW) ................................. 111129233

(51) Int. Cl.
*H01Q 1/22* (2006.01)
*H01Q 1/12* (2006.01)
*H01Q 21/20* (2006.01)

(52) U.S. Cl.
CPC ............. *H01Q 1/22* (2013.01); *H01Q 1/1242* (2013.01); *H01Q 21/205* (2013.01)

(58) Field of Classification Search
CPC ...... H01Q 1/12; H01Q 1/1207; H01Q 1/1242; H01Q 1/22; H01Q 1/246; F21S 8/085; F21V 33/00; F21V 27/00; F21V 23/00; F21V 23/002
See application file for complete search history.

(56) References Cited

U.S. PATENT DOCUMENTS

| | | | | |
|---|---|---|---|---|
| 2009/0040750 | A1* | 2/2009 | Myer | H10F 77/68 136/246 |
| 2010/0026604 | A1* | 2/2010 | Caldwell | H01Q 1/1242 343/890 |
| 2017/0122546 | A1* | 5/2017 | Abbott | F21S 9/035 |
| 2017/0279187 | A1* | 9/2017 | Lockwood | H01Q 1/42 |
| 2018/0094782 | A1* | 4/2018 | Chiang | F21V 21/10 |
| 2018/0098379 | A1* | 4/2018 | Chiang | H05B 47/19 |
| 2018/0254545 | A1* | 9/2018 | Hendrix | H01Q 1/44 |
| 2018/0351245 | A1* | 12/2018 | Constance | H01Q 1/245 |
| 2019/0221913 | A1* | 7/2019 | Castronova | H01Q 1/44 |
| 2019/0277050 | A1* | 9/2019 | Lockwood | H01Q 1/1242 |
| 2020/0136236 | A1* | 4/2020 | Colapietro | H01Q 1/42 |
| 2020/0388902 | A1* | 12/2020 | Colapietro | H01Q 1/44 |
| 2021/0083372 | A1* | 3/2021 | Chase | H01Q 1/44 |
| 2021/0131629 | A1* | 5/2021 | Bembridge | H01Q 1/42 |

(Continued)

*Primary Examiner* — Jason M Crawford
(74) *Attorney, Agent, or Firm* — LANWAY IPR SERVICES; Chun-Ming Shih

(57) ABSTRACT

A combined streetlight, which is provided, is equipped with a cable set, a cable routing base, an equipment cabinet, and a frame. By combining and structurally designing of an attached equipment installation component, an antenna assembly, and other components, it can meet the installation requirements of various network devices and related equipment in smart cities. Additionally, by combining and structurally designing components of an installation structure shielding enclosure, it can achieve aesthetic appeal to meet urban aesthetics. Therefore, the proposed combined streetlight is suitable for use in the construction of smart cities.

20 Claims, 15 Drawing Sheets

(56) References Cited

U.S. PATENT DOCUMENTS

| | | | | |
|---|---|---|---|---|
| 2021/0246681 | A1* | 8/2021 | Yanda | E04H 12/003 |
| 2021/0313665 | A1* | 10/2021 | Hoganson | H01Q 1/02 |
| 2021/0320393 | A1* | 10/2021 | Williams | H04W 88/08 |
| 2021/0328337 | A1* | 10/2021 | Gienger | H01Q 1/12 |
| 2021/0336331 | A1* | 10/2021 | Rai | H01Q 1/42 |
| 2021/0396365 | A1* | 12/2021 | Friederichs | F21S 8/088 |
| 2022/0090749 | A1* | 3/2022 | Pretorius | F21V 23/008 |
| 2022/0223993 | A1* | 7/2022 | Gienger | F21V 23/02 |
| 2024/0047866 | A1* | 2/2024 | Chiang | H01Q 1/22 |
| 2024/0210001 | A1* | 6/2024 | Chiang | F21V 21/36 |

* cited by examiner

COMBINED STREETLIGHT

CROSS-REFERENCE TO RELATED APPLICATIONS

This application claims the priority of Republic of China Patent Application No. 111129233 filed on Aug. 3, 2022, in the State Intellectual Property Office of the R.O.C., the disclosure of which is incorporated herein by reference.

BACKGROUND OF THE INVENTION

Field of the Invention

The present invention relates to streetlight device technology fields, and more particularly, to a combined streetlight suitable for smart city construction.

Descriptions of the Related Art

With the continuous development of internet technology, the application level of urban informatization has been steadily increasing, leading to the emergence of smart city construction. The construction of smart cities is closely related to the widespread deployment of network and related equipment. Therefore, in various public areas of smart cities, the presence of network equipment is ubiquitous. For example, network surveillance cameras used for urban security management or traffic monitoring, or network environmental sensors used to monitor the quality of the urban environment.

However, the installation of these network and related equipment are currently not regulated. Some equipment is directly installed on poles in the city, which disrupts the original road construction planning and even damages the aesthetic appearance of the city. Additionally, some equipment is chosen to be installed on widely covered and evenly distributed streetlights in the city. However, since city streetlights are primarily designed for illumination rather than installing other devices, the existing structure of streetlights cannot meet the installation requirements of various network and related equipment.

Given this, the technical challenge to be addressed by this invention is how to design a streetlight that can install various network and related equipment installations.

SUMMARY OF THE INVENTION

Given the shortcomings of the above-mentioned prior art, the present invention provides a combined streetlight is equipped with an internal equipment, an inner-frame equipment, and an attached equipment and, including: a cable set; a cable routing base, which provides a structure to wind the cable set; an equipment cabinet, located above the cable routing base, providing space for installing internal equipment; a frame, positioned above the equipment cabinet, with a cable set installation structure and an inner-frame equipment installation structure, and the cable set installation structure allows for the installation of the cable set, while the inner-frame equipment installation structure allows for the installation of inner-frame equipment; an attached equipment installation component, assembled on top of the frame, designed to install attached equipment; an installation structure shielding enclosure component, assembled on the frame, is integrated with the frame to form a pole body, and the installation structure shielding enclosure component includes a cable set installation structure shielding enclosure and an inner-frame equipment installation structure shielding enclosure, in the pole body, the cable set installation structure shielding enclosure shields the cable set installation structure, and the inner-frame equipment installation structure shielding enclosure shields the inner-frame equipment installation structure; and an antenna assembly, assembled above the attached equipment installation component, with an antenna base and an antenna array, and the antenna array is placed on the antenna base for signal transmission and reception.

Preferably, in the combined streetlight said above, the attached equipment installation component includes at least one pole insertion structure and at least one attached equipment installation pole, and the attached equipment installation pole is inserted into the pole insertion structure for installing the attached equipment.

Preferably, in the combined streetlight said above, the frame is a truss.

Preferably, in the combined streetlight said above, the frame has an H-shaped cross-section, a U-shaped cross-section, or a rectangular cross-section.

Preferably, in the combined streetlight said above, the attached equipment installation pole is a H-shaped rod body.

Preferably, in the combined streetlight said above, the equipment cabinet is equipped with an equipment cabinet chimney structure, which includes an equipment cabinet chimney opening and an equipment cabinet chimney wall and the equipment cabinet chimney opening allows for the passage of the cable set, and the equipment cabinet chimney wall is positioned around the equipment cabinet chimney opening, extending upwards from the surface of the equipment cabinet to serve as a barrier to prevent liquid on the surface of the equipment cabinet from entering the equipment cabinet through the equipment cabinet chimney opening.

Preferably, in the combined streetlight said above, the combined streetlight further includes a cooling fan, which is installed above the equipment cabinet chimney structure to generate airflow and provide ventilation and cooling for the equipment cabinet.

Preferably, in the combined streetlight said above, the combined streetlight further includes an active cooling device, which is installed in the equipment cabinet to provide a cooling circulation and cool the internal equipment within the cabinet.

Preferably, in the combined streetlight said above, the attached equipment installation component further has an attached equipment installation component chimney structure, which includes an attached equipment installation component chimney opening and an attached equipment installation component chimney wall, and the attached equipment installation component chimney opening allows for the passage of the cable set, and the attached equipment installation component chimney wall is positioned around the attached equipment installation component chimney opening, extending upwards from the surface of the attached equipment installation component to serves as a barrier to prevent liquid on the surface of the attached equipment installation component from entering the attached equipment installation component through the attached equipment installation component chimney opening.

Preferably, in the combined streetlight said above, the attached equipment installation component further includes an attached equipment antenna assembly combine component and an attached equipment antenna assembly heightening component, and the attached equipment antenna assembly combine component is designed to combine the attached equipment or the antenna assembly, and the attached equipment antenna assembly heightening component is joined to the attached equipment antenna assembly combine component to provide heightening, ensuring that the height of the attached equipment or the antenna assembly meets the expected requirement.

Preferably, in the combined streetlight said above, the attached equipment antenna assembly heightening component has a heightening component cabling structure, which allows the cable set to pass through, enabling the cable set to connect with the attached equipment or the antenna assembly.

Preferably, in the combined streetlight said above, further including: a frame cabling equipment and an internal cabling equipment, and the frame cabling equipment is installed in the frame and connects with the cable set, allowing the frame cabling equipment to cable for the cable set in the frame; the internal cabling equipment is installed in the equipment cabinet and connects with the cable set, allowing the internal cabling equipment to cable for the cable set in the equipment cabinet.

Preferably, in the combined streetlight said above, further including: an internal cabling equipment, and the internal cabling equipment is installed in the frame and connects with the cable set, allowing the internal cabling equipment to cable for the cable set in the frame.

Preferably, in the combined streetlight said above, the combined streetlight is further equipped with an outer-frame equipment, and the frame further has an outer-frame equipment installation structure, wherein the outer-frame equipment installation structure is designed to install the outer-frame equipment, and the installation structure shielding enclosure component further includes an outer-frame equipment installation structure shielding enclosure, and in the pole body, the outer-frame equipment installation structure shielding enclosure serves to shield the outer-frame equipment installation structure.

Preferably, in the combined streetlight said above, further including: a combined structure shielding enclosure component is installed on the pole body to shield the combined structure that combines the installation structure shielding enclosure component with the frame.

Preferably, in the combined streetlight said above, the combined structure shielding enclosure component includes a plurality of combined structure shielding enclosures, and the combined structure shielding enclosures can move relative to each other on the pole body to allow at least two of the combined structure shielding enclosures to partially overlap, shortening the combined structure shielding enclosure component, and exposes the combined structure used to combine the installation structure shielding enclosure component on the frame.

Preferably, in the combined streetlight said above, further including: an equipment cabinet liquid blocking component, and the equipment cabinet further has an equipment cabinet cabling structure, wherein the equipment cabinet cabling structure is located near the cable routing base to provide passage for the cable set, and the equipment cabinet liquid blocking component is designed to prevent the liquid of the cable routing base from flowing into the equipment cabinet through the equipment cabinet cabling structure.

Preferably, in the combined streetlight said above, the antenna assembly includes a first-layer antenna, a second-layer antenna, and a third-layer antenna; the antenna base comprises a first-layer antenna installation structure, a second-layer antenna installation structure, and a third-layer antenna installation structure; the first-layer antenna installation structure positions the first-layer antenna at a first height and allows the first-layer antenna to be oriented in a first direction for signal transmission and reception; the second-layer antenna installation structure positions the second-layer antenna at a second height and allows the second-layer antenna to be oriented in a second direction for signal transmission and reception; the third-layer antenna installation structure positions the third-layer antenna at a third height and allows the third-layer antenna to be oriented in a third direction for signal transmission and reception, wherein the first height position, the second height position, and the third height position are different, and the first direction, the second direction, and the third direction are also different.

Preferably, in the combined streetlight said above, the antenna assembly further includes a camouflage component, which is assembled onto the antenna base and the camouflage component is positioned on the antenna base to avoid obstructing the antenna assembly's position, preventing the camouflage component from blocking the signal transmission and reception of the antenna assembly.

Preferably, in the combined streetlight said above, the cable set includes a left-side cable, a right-side cable, and a back-side cable, the frame comprises a left-side frame substructure, a right-side frame substructure, and a back-side frame substructure, and the cable set installation structure shielding enclosure includes a left-side cable installation structure shielding sub-enclosure, a right-side cable installation structure shielding sub-enclosure, and a back-side cable installation structure shielding sub-enclosure, wherein the cable set installation structure includes a left-side cable installation substructure, a right-side cable installation substructure, and a back-side cable installation substructure; the left-side cable installation substructure is for installing the left-side cable, the right-side cable installation substructure is for installing the right-side cable, and the back-side cable installation substructure is for installing the back-side cable; the left-side cable installation structure shielding sub-enclosure is assembled to the left-side frame substructure, the right-side cable installation structure shielding sub-enclosure is assembled to the right-side frame substructure, and the back-side cable installation structure shielding sub-enclosure is assembled to the back-side frame substructure; within the pole body, the left-side cable installation structure shielding sub-enclosure conceals the left-side cable installation substructure, the right-side cable installation structure shielding sub-enclosure conceals the right-side cable installation substructure, and the back-side cable installation structure shielding sub-enclosure conceals the back-side cable installation substructure.

Preferably, in the combined streetlight said above, the antenna array includes a first-layer antenna, a second-layer antenna, and a third-layer antenna; the antenna base includes a first-layer antenna installation structure, a second-layer antenna installation structure, and a third-layer antenna installation structure; the first-layer antenna installation structure positions the first-layer antenna at a first height and allows the first-layer antenna to be oriented in a first direction for signal transmission and reception; the second-layer antenna installation structure positions the second-layer antenna at a second height and allows the second-layer antenna to be oriented in a second direction for signal transmission and reception; the third-layer antenna installation structure positions the third-layer antenna at a third height and allows the third-layer antenna to be oriented in a third direction for signal transmission and reception, wherein the first height position, the second height position, and the third height position are the same, and the first direction, the second direction, and the third direction are different.

Preferably, in the combined streetlight said above, the frame further includes a front-side frame substructure, and the inner-frame equipment installation structure shielding enclosure is assembled to the front-side frame substructure.

Preferably, in the combined streetlight said above, further including: a flexible equipment, which can adapt to the deformation of the installation structure shielding enclosure or the outer-frame equipment, and fit snugly with the installation structure shielding enclosure or the outer-frame equipment.

Preferably, in the combined streetlight said above, the flexible equipment is a flexible screen or a flexible battery.

Preferably, in the combined streetlight said above, the inner-frame equipment installation structure is a track-type equipment installation structure, and the track-type equipment installation structure is used to secure the inner-frame equipment.

Preferably, in the combined streetlight said above, the track-type equipment installation structure is DIN Rail.

Preferably, in the combined streetlight said above, the frame has a frame chimney structure, which includes a frame chimney opening and a frame chimney wall, wherein the frame chimney opening provides a passage for the cable set, and the frame chimney wall is positioned around the frame chimney opening and extends upwards from the surface of the frame, providing a barrier to prevent liquid on the surface of the frame from entering the frame through the frame chimney opening.

Compared to the prior art, the provided combined streetlight in this application includes a cable set, a cable routing base, an equipment cabinet, and a frame. It can meet the installation requirements of various network devices and related equipment in smart cities by combining and structurally designing of an attached equipment installation component, an antenna assembly, and other components. It also satisfies the aesthetic requirements of urban landscapes by combining and structurally designing components of an installation structure shielding enclosure. Therefore, the combined streetlight described in this application is suitable for use in the construction of smart cities.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED

Embodiment

Figure 1:
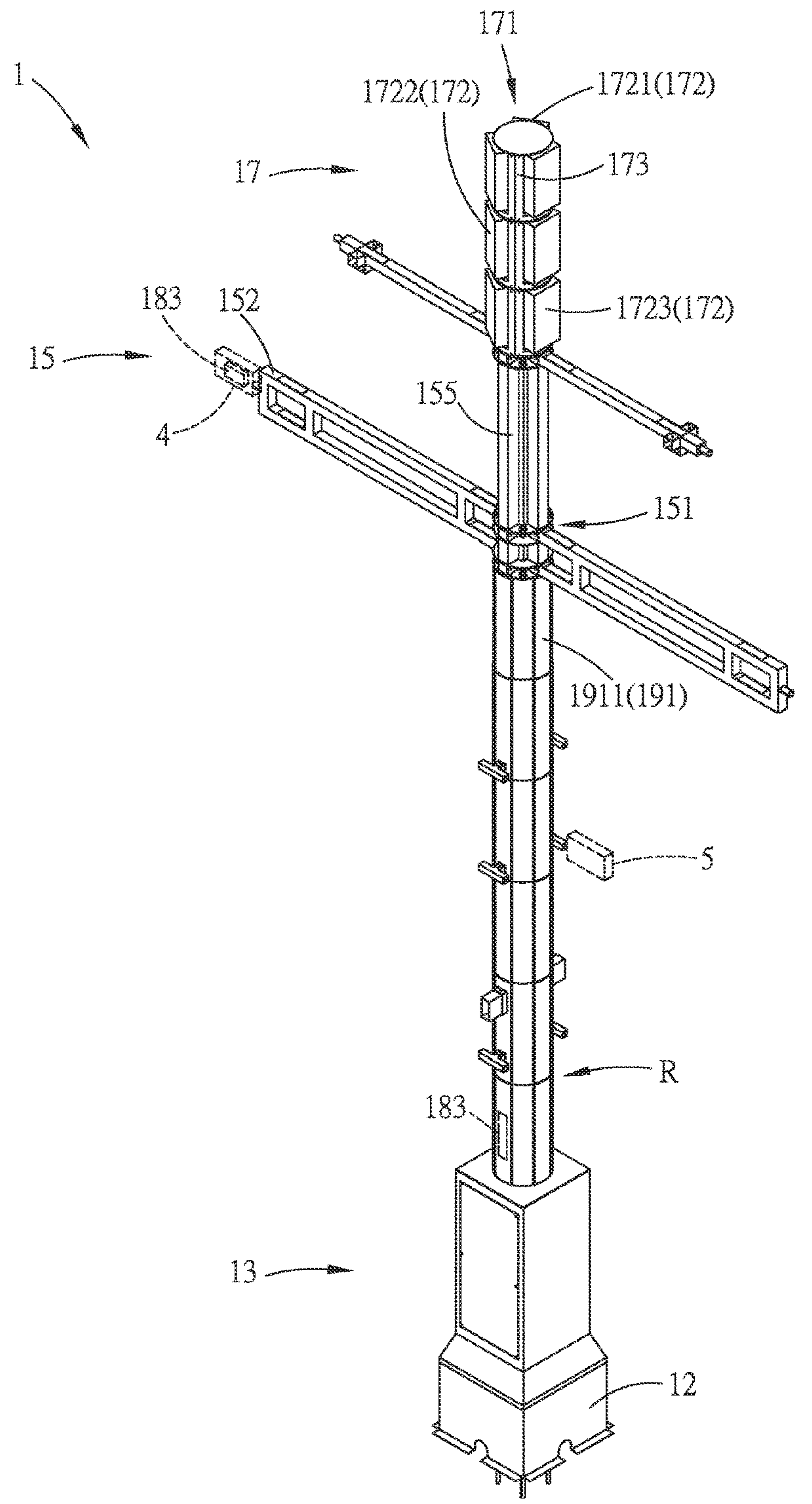
FIG. 1 is a three-dimensional schematic diagram of the embodiment of the combined streetlight in the present application.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

This application provides a combined streetlight, which can meet the installation requirements of various network devices and related equipment in smart cities through the combined of different components and structural designs. The combined streetlight also features a camouflage design to meet urban aesthetics.

Technical features of a combined streetlight according to the present application are described with reference to FIGS. 1 to 15 and the following embodiments.

In the embodiments shown in FIGS. 1 to 15, a combined streetlight 1 can be equipped with an internal equipment 2, an inner-frame equipment 3, an attached equipment 4, and an outer-frame equipment 5.

It should be noted that the internal equipment 2 and the inner-frame equipment 3 may include components such as circuit breakers, electric meters (including smart meters), power distribution panels (PDP), current transformers, fiber distribution cabinets (FDB), communication cable distribution cabinets, DWDM multiplexers, switched-mode power supplies (SMPS), POE switches, IoT gateways, switched mode rectifiers (SMR), batteries, base stations (CU/DU/RU), NVRs (Network Video Recorders), MEC servers (Multi-Access Edge Computing servers), UPF servers (User Plane Function servers), or UPS uninterrupted power supply systems. The attached equipment 4 may include items like traffic lights or road signs. The outer-frame equipment 5 may consist of network monitoring cameras or network environmental sensors.

Figure 2:
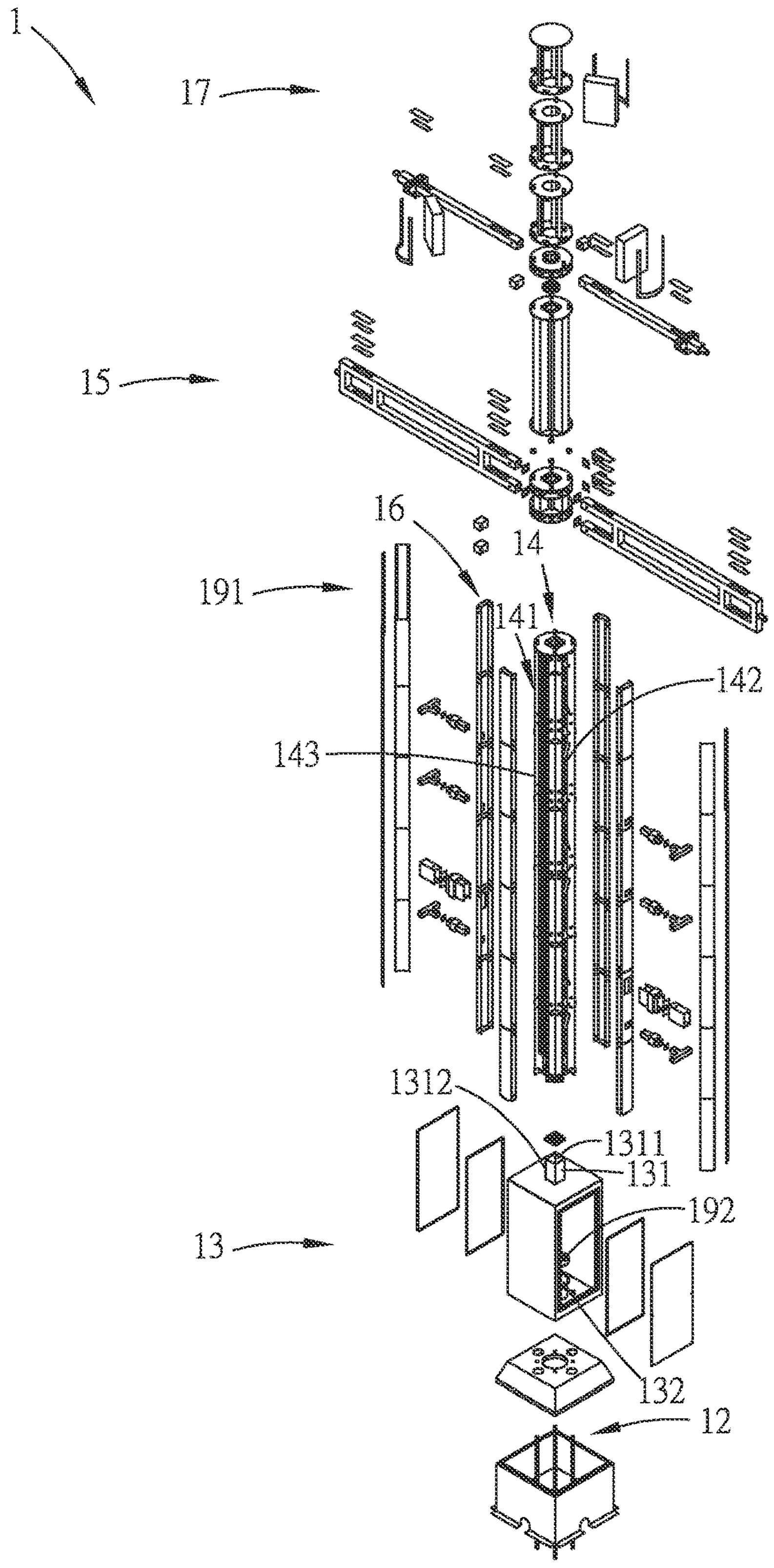
FIG. 2 is an exploded view diagram of some components of the embodiment of the combined streetlight in the present application.

In the above-described embodiments, as shown in FIG. 2, the combined streetlight 1 includes: a cable set 11, a cable routing base 12, an equipment cabinet 13, a frame 14, an attached equipment installation component 15, an installation structure shielding enclosure component 16, and an antenna assembly 17.

Figure 13:
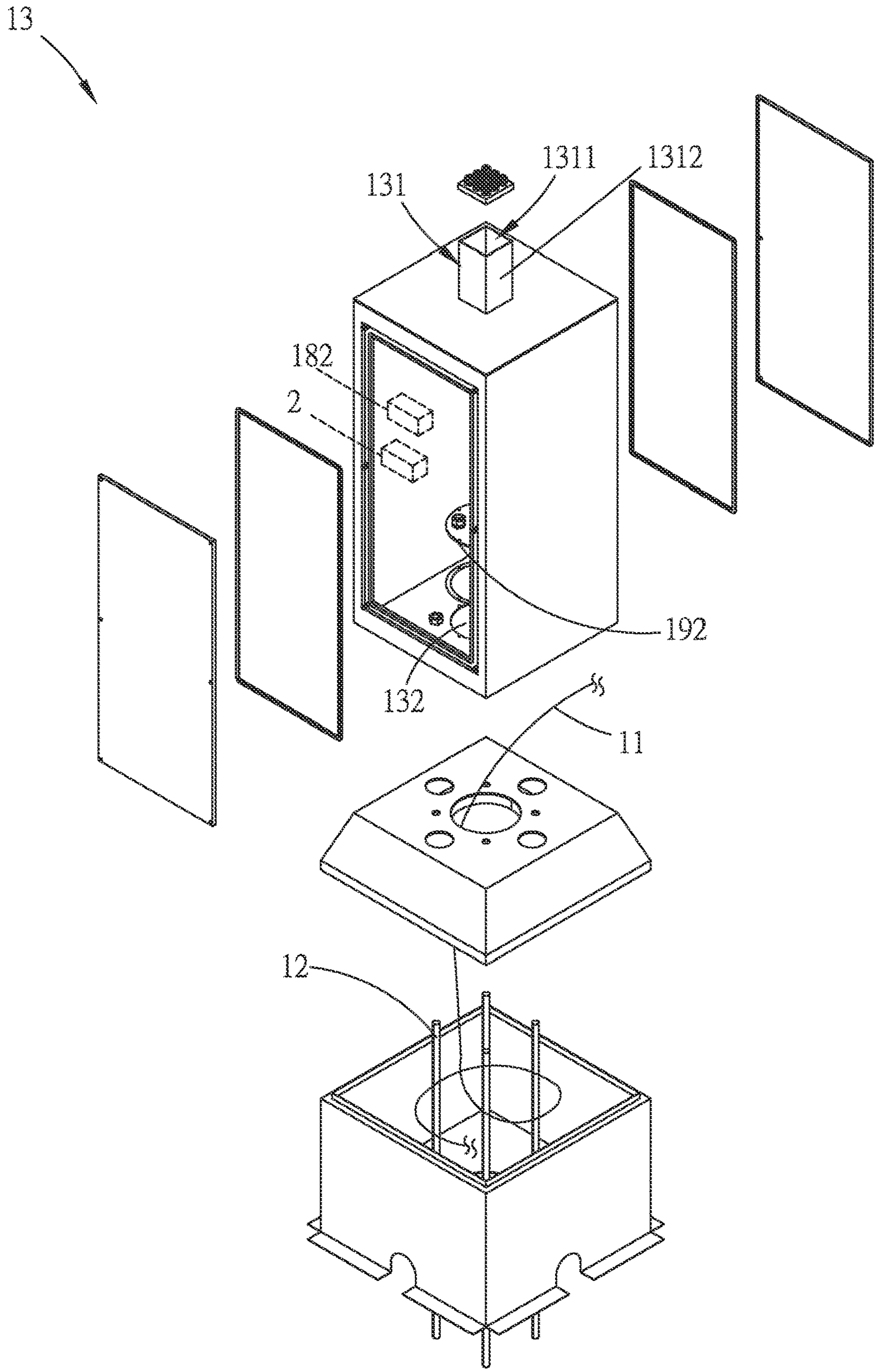
FIG. 13 is an exploded view diagram of some components of the embodiment of the combined streetlight in the present application.
Figure 14:
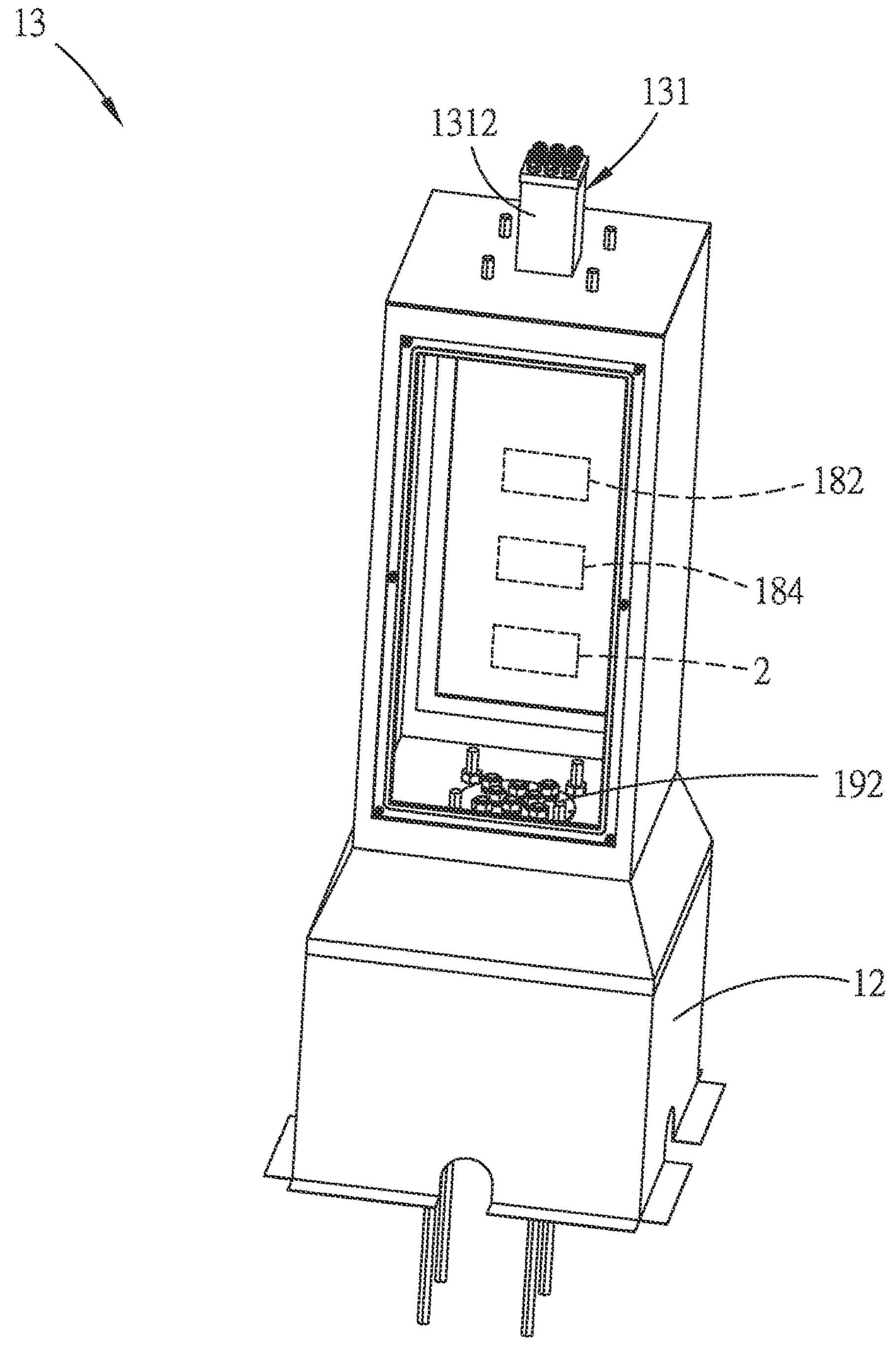
FIG. 14 is a three-dimensional schematic diagram of some components of the embodiment of the combined streetlight in the present application.
Figure 15:
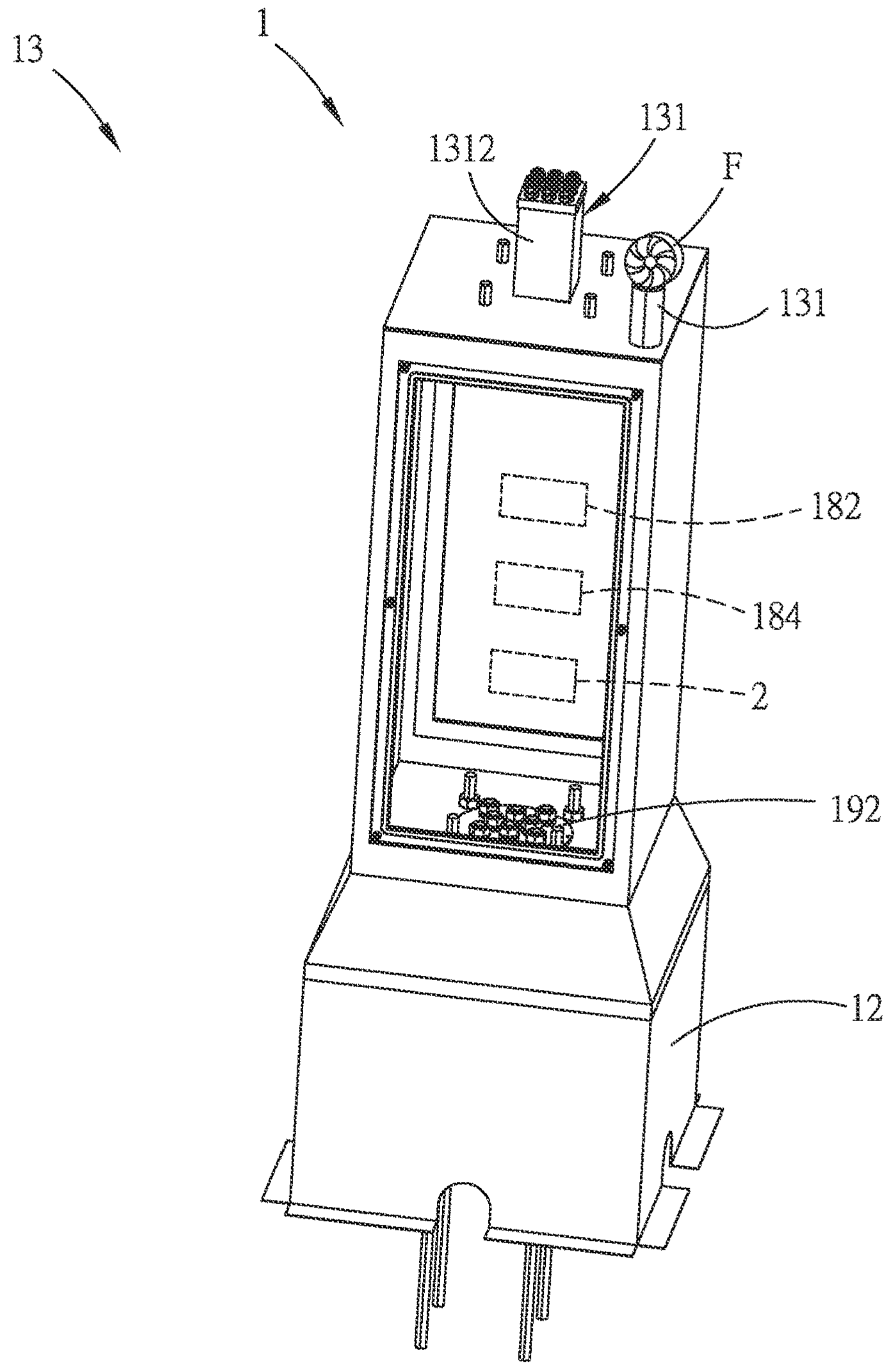
FIG. 15 is a three-dimensional schematic diagram of some components of the embodiment of the combined streetlight in the present application.

As shown in FIGS. 8 to 12, the cable set 11 includes multiple sets of cables such as a left-side cable 111, a right-side cable 112, and a back-side cable 113. The cables may, for example, be power cables, signal cables, network cables, or optical fiber cables. As shown in FIG. 13, the cable routing base 12 provides a means to arrange the cable set 11 for organization. As shown in FIGS. 13 to 15, the equipment cabinet 13 is located above the cable routing base 12, allowing the cable set 11 to be arranged and organized below the equipment cabinet 13 to prevent the cable set 11 from occupying the limited internal space of the equipment cabinet 13, ensuring that sufficient space is available inside the equipment cabinet 13 for the installation of internal equipment 2.

In the above-described embodiments, as shown in FIG. 13, the equipment cabinet 13 has an equipment cabinet chimney structure 131 and an equipment cabinet cabling structure 132. The equipment cabinet chimney structure 131 includes an equipment cabinet chimney opening 1311 and an equipment cabinet chimney wall 1312. It should be noted that the equipment cabinet chimney opening 1311 is provided to allow the passage of the cable set 11. The equipment cabinet chimney wall 1312 is located around the equipment cabinet chimney opening 1311 and extends upward from the surface of the equipment cabinet 13. As liquid tends to flow downwards, the equipment cabinet chimney wall 1312 can prevent the liquid on the surface of the equipment cabinet 13 from entering the equipment cabinet 13 through the equipment cabinet chimney opening 1311 and affecting the operation of the internal equipment 2 to meet the installation requirements of the internal equipment 2.

The equipment cabinet cabling structure 132 is located adjacent to the cable routing base 12 and provides a passage for the cable set 11 through the cable routing base 12. As shown in FIG. 13, the combined streetlight 1 is equipped with an equipment cabinet liquid blocking component 192 near the cable routing base 12. The equipment cabinet liquid blocking component 192 is designed to prevent liquid of the cable routing base 12 from entering equipment cabinet 13 and affecting the operation of the internal equipment 2 through the equipment cabinet cabling structure 132. As shown in FIG. 13, the interior of equipment cabinet 13 of the combined streetlight 1 is equipped with internal cabling equipment 182, which is connected with the cable set 11 and provides cabling for the cable set 11 inside the equipment cabinet 13.

Due to the risk of abnormal operation or damage to the internal equipment 2 caused by high temperatures inside the equipment cabinet 13, in the embodiment shown in FIG. 15, the combined streetlight 1 is equipped with a cooling fan F. The cooling fan F is positioned above the equipment cabinet chimney structure 131 to generate airflow and provide ventilation and cooling for the equipment cabinet 13 through the equipment cabinet chimney structure 131 to avoid elevated temperatures inside the equipment cabinet 13 and ensures the proper operation of the internal equipment 2, meeting the installation requirements of the internal equipment 2. Additionally, in the embodiments shown in FIGS. 14 and 15, the combined streetlight 1 is equipped with an active cooling device 184 installed inside the equipment cabinet 13. The active cooling device 184 provides a cooling cycle to cool the internal equipment 2 inside the equipment cabinet 13 and prevents the temperature of the internal equipment 2 from reaching levels that could hinder their normal operation. This arrangement meets the installation requirements of the internal equipment 2. The active cooling device 184 includes components to provide the cooling cycle such as a refrigerant and a condenser.

Figure 9:
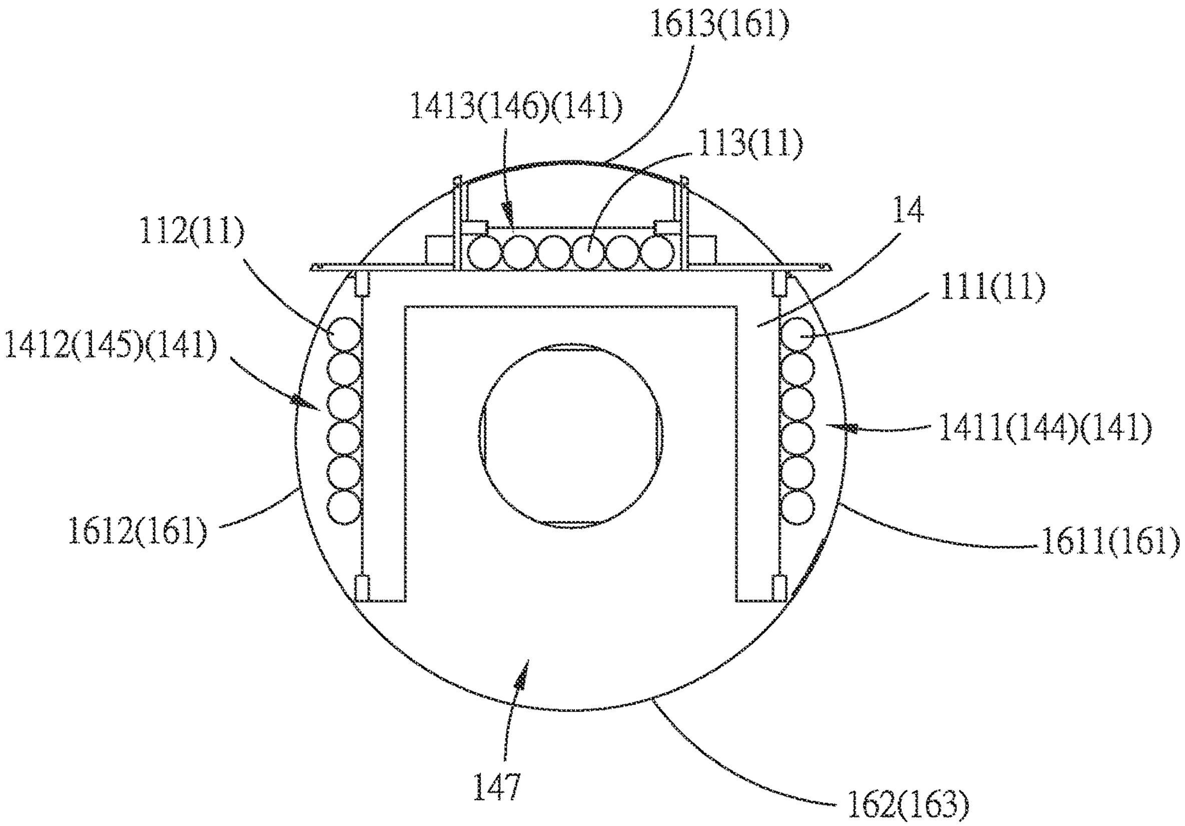
FIG. 9 is a cross-section diagram of some components of the embodiment of the combined streetlight in the present application.
Figure 10:
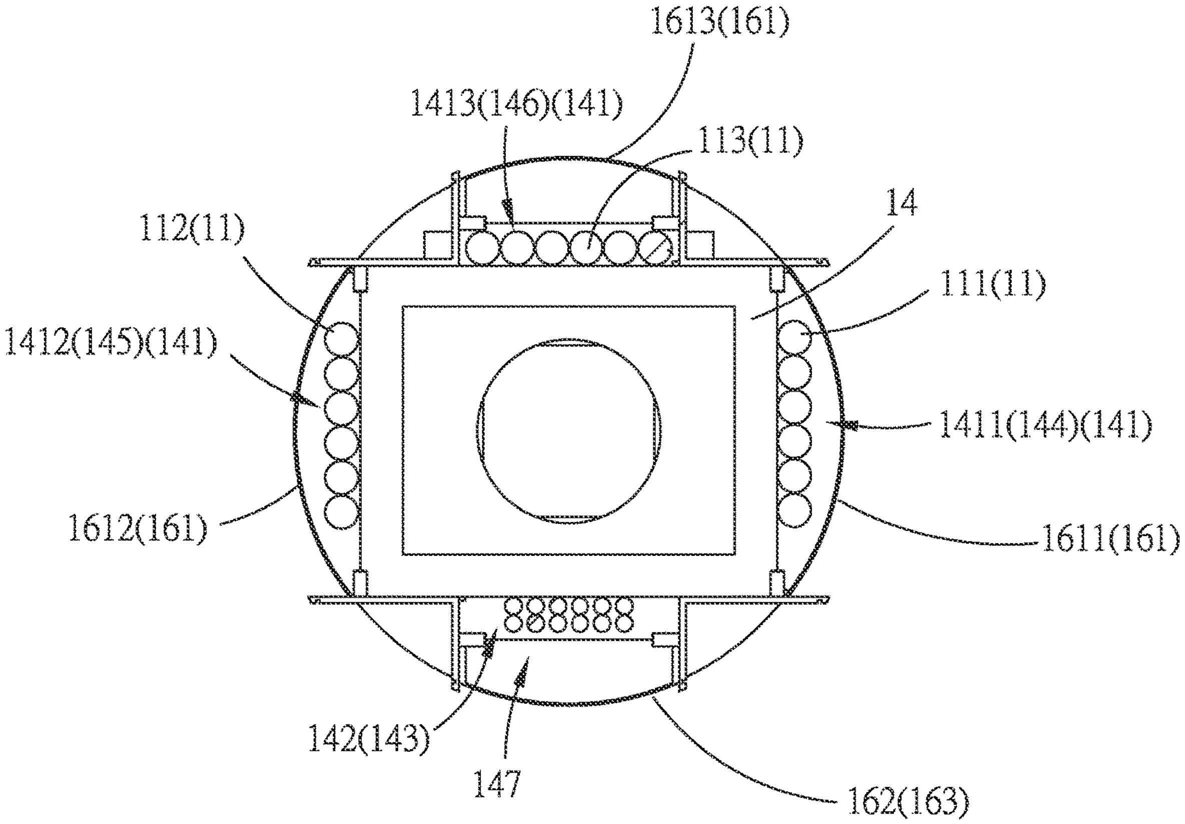
FIG. 10 is a cross-section diagram of some components of the embodiment of the combined streetlight in the present application.
Figure 11:
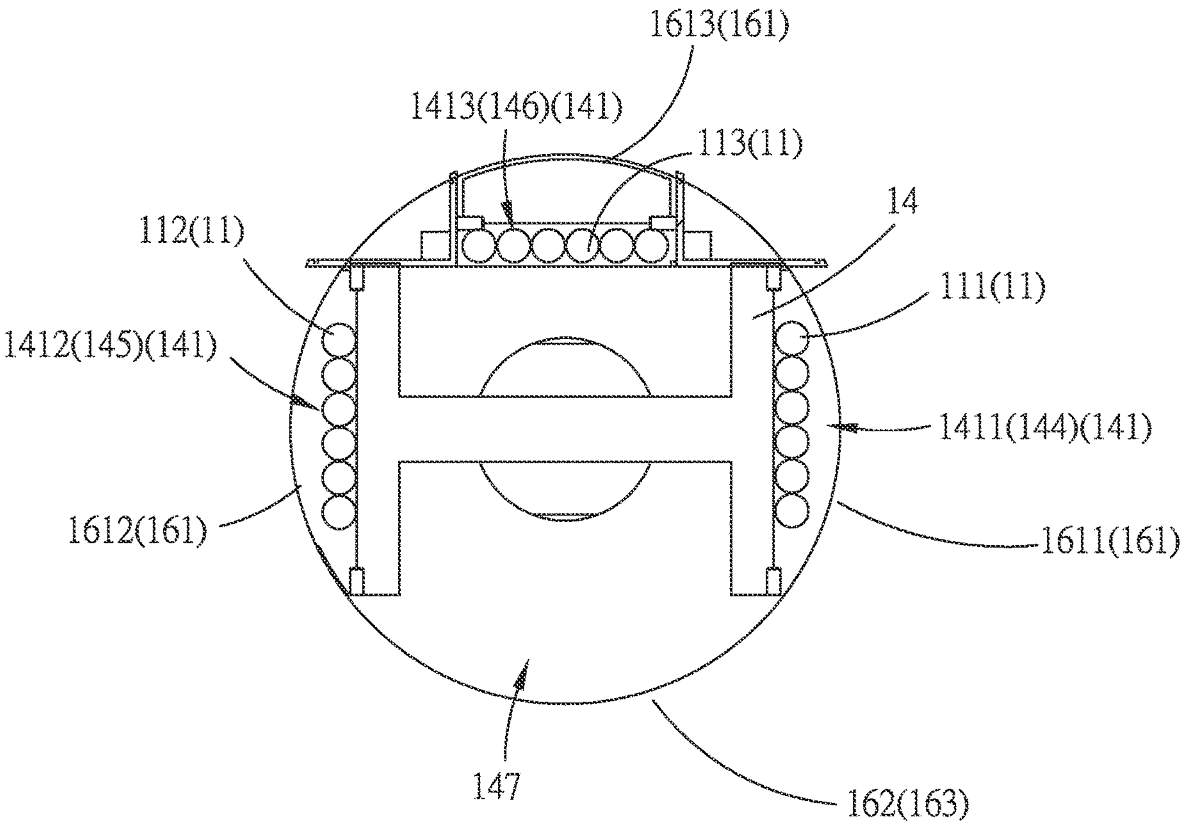
FIG. 11 is a cross-section diagram of some components of the embodiment of the combined streetlight in the present application.
Figure 12:
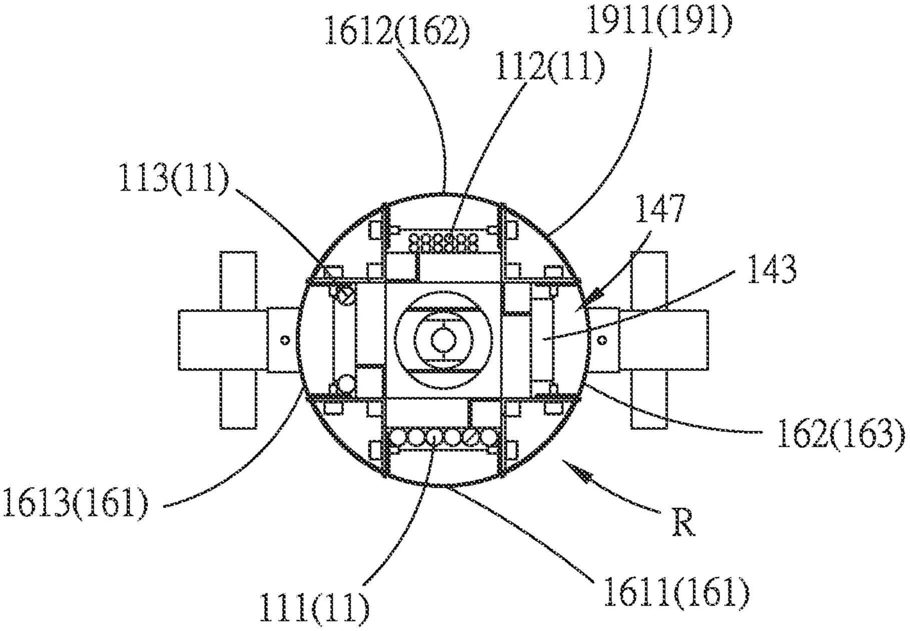
FIG. 12 is a cross-section diagram of some components of the embodiment of the combined streetlight in the present application.

In the above-described embodiments, as shown in FIG. 2, the frame 14, for example, is a truss located above the equipment cabinet 13, and the frame 14 may have cross-sections such as an H-shaped cross-section as shown in FIG. 11, a U-shaped cross-section as shown in FIG. 9, or a rectangular cross-section as shown in FIG. 10. Additionally, the frame 14 can include various equipment installing structures, such as a cable set installation structure 141 shown in FIG. 7 for installing the cable set 11, an inner-frame equipment installation structure 142 shown in FIG. 7 for installing the inner-frame equipment 3, and an outer-frame equipment installation structure 143 shown in FIG. 6 for installing the outer-frame equipment 5. It should be noted that the inner-frame equipment installation structure 142 can be a track-type equipment installation structure such as DIN Rail to allow the inner-frame equipment 3 to be securely installed using the track-type equipment installation structure, facilitating the installation of the inner-frame equipment 3.

Figure 7:
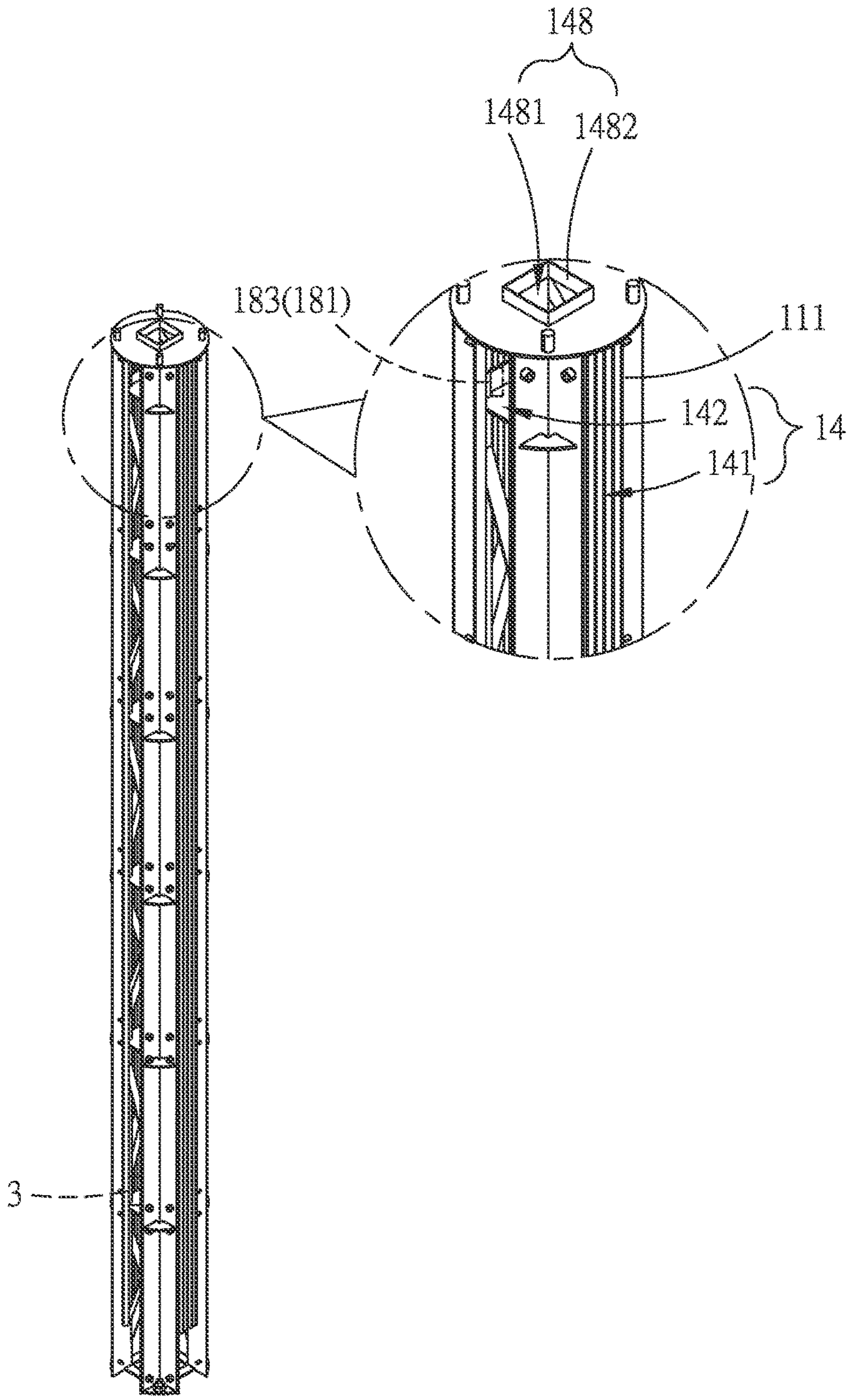
FIG. 7 is a three-dimensional schematic diagram of some components of the embodiment of the combined streetlight in the present application.

As shown in FIG. 7, the frame 14 has a frame chimney structure 148, which includes a frame chimney opening 1481 and a frame chimney wall 1482. The frame chimney opening 1481 is provided for threading the cable set 11, and the frame chimney wall 1482 is placed around the frame chimney opening 1481 and extends upward from the surface of the frame 14. As liquid tends to flow downwards, the frame chimney wall 1482 acts as a barrier to prevent liquid on the surface of the frame 14 from entering the frame 14 through the frame chimney opening 1481, thus ensuring the proper installation of the inner-frame equipment 3 and meeting installation requirements of the inner-frame equipment 3.

Additionally, as shown in FIG. 7, the interior of the frame 14 is equipped with frame cabling equipment 181, which is used to connect the cable set 11 and provide cabling for the cable set 11 within the frame 14.

As shown in FIG. 1, the attached equipment installation component 15 is combined with the upper part of the frame 14, and the attached equipment installation component 15 comprises a plurality of pole insertion structures 151 and a plurality of attached equipment installation pole 152. Each attached equipment installation pole 152 can be inserted into a suitable pole insertion structure 151 according to the specific installation requirements, allowing the placement of the attached equipment 4 at the desired position, thereby meeting the installation needs of the attached equipment 4. It should be noted that the number of pole insertion structure 151 and attached equipment installation pole 152 are not limited to multiple, and can be adjusted to meet the requirements of the specific application area of the streetlight. In the illustrated embodiment shown in FIG. 1, the attached equipment installation pole 152 is in an H-shaped structure to enhance the structural strength of attached equipment installation pole 152.

Figure 3:
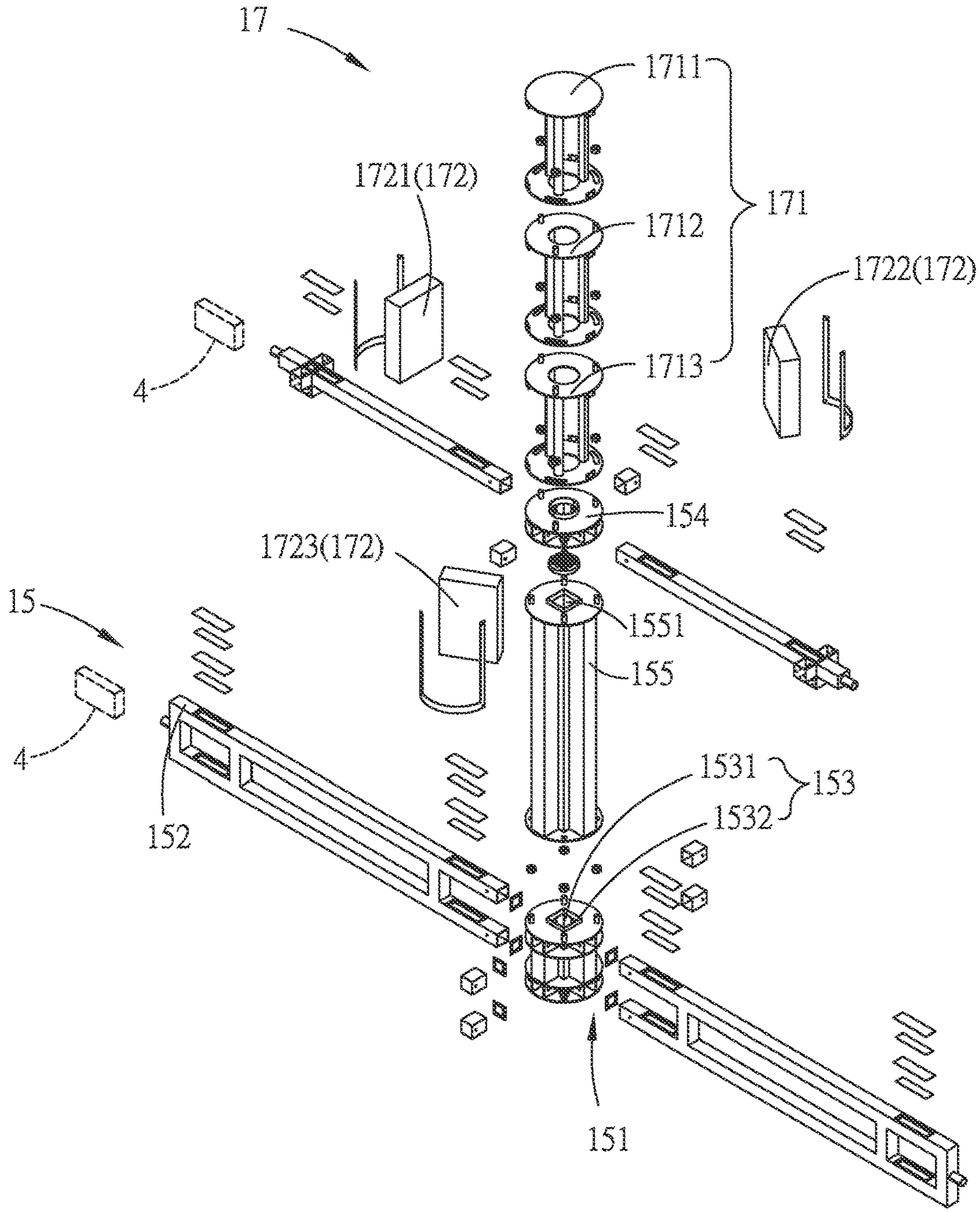
FIG. 3 is an exploded view diagram of some components of the embodiment of the combined streetlight in the present application.
Figure 4:
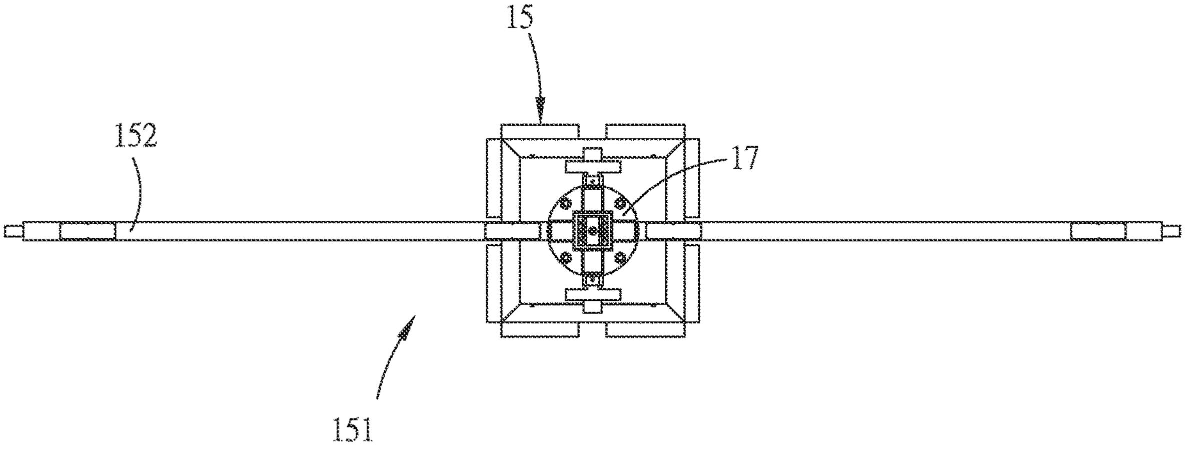
FIG. 4 is a top view diagram of some components of the embodiment of the combined streetlight in the present application.
Figure 5:
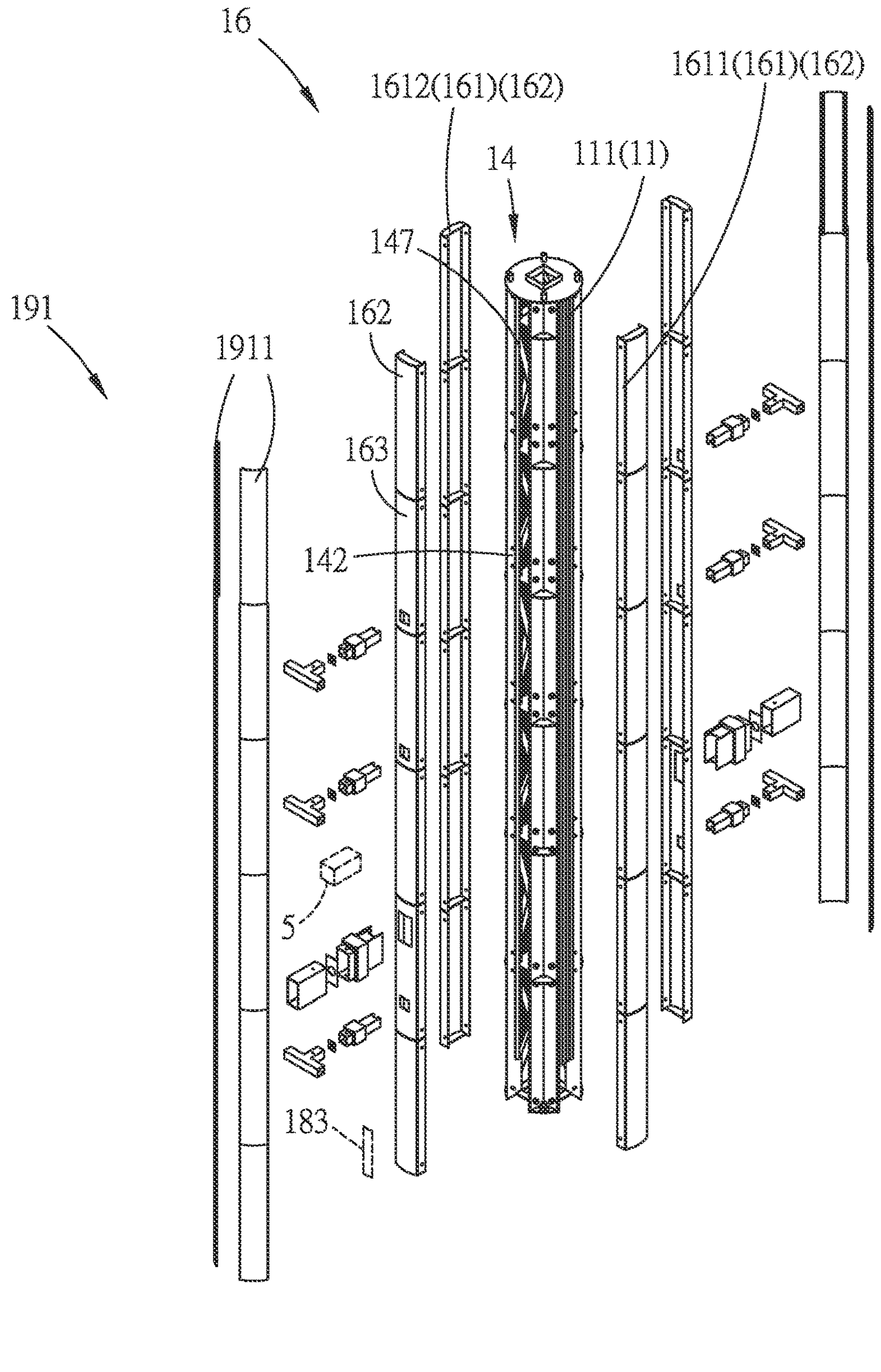
FIG. 5 is an exploded view diagram of some components of the embodiment of the combined streetlight in the present application.

As shown in FIG. 3, the attached equipment installation component 15 has an attached equipment installation component chimney structure 153, which includes an attached equipment installation component chimney opening 1531 and an attached equipment installation component chimney wall 1532. The attached equipment installation component chimney opening 1531 provides a passage for the passage of the cable set 11. The attached equipment installation component chimney wall 1532 is positioned around the attached equipment installation component chimney opening 1531 and extends upward from the surface of the attached equipment installation component 15. Since liquid tends to flow downward, the attached equipment installation component chimney wall 1532 prevents liquid on the surface of the attached equipment installation component 15 from entering the attached equipment installation component 15 through the attached equipment installation component chimney opening 1531, thus meeting the installation requirements of the attached equipment 4.

As shown in FIG. 3, the attached equipment installation component 15 includes an attached equipment antenna assembly combine component 154 and an attached equipment antenna assembly heightening component 155. The attached equipment antenna assembly combine component 154 combines the attached equipment 4 or antenna assembly 17, for example, by using a locking attached method. The attached equipment antenna assembly heightening component 155 is joined to the attached equipment antenna assembly combine component 154 to provide heightening for the attached equipment antenna assembly combine component 154, ensuring that the height of the attached equipment 4 or antenna assembly 17 meets the expected requirements and satisfies the installation needs of the attached equipment 4 or the antenna assembly 17. Moreover, the attached equipment antenna assembly heightening component 155 includes a heightening component cabling structure 1551, which provides a passage for the cable set 11, allowing the cable set 11 to connect with the attached equipment 4 or antenna assembly 17.

Figure 8:
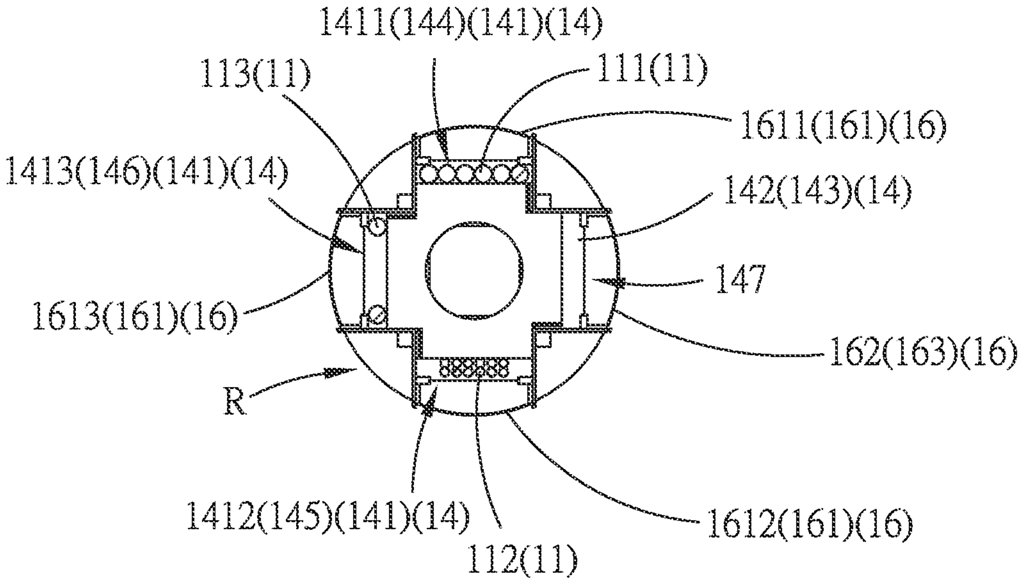
FIG. 8 is a cross-section diagram of some components of the embodiment of the combined streetlight in the present application.

In the above-described embodiments, as shown in FIG. 8, the installation structure shielding enclosure component 16 is combined with the frame 14, for example, using a locking attached method, to form a pole body. The installation structure shielding enclosure component 16 includes cable set installation structure shielding enclosure 161, inner-frame equipment installation structure shielding enclosure 162, and outer-frame equipment installation structure shielding enclosure 163. In the pole body R, the cable set installation structure shielding enclosure 161 provides shielding for the cable set installation structure 141, the inner-frame equipment installation structure shielding enclosure 162 provides shielding for the inner-frame equipment installation structure 142, and the outer-frame equipment installation structure shielding enclosure 163 provides shielding for the outer-frame equipment installation structure 143. It should be noted that through the use of the aforementioned installation structure shielding enclosure designs, the exposed appearance of the equipment installation structures on the pole body R is avoided, ensuring aesthetics and satisfying the urban aesthetics of smart cities.

Figure 6:
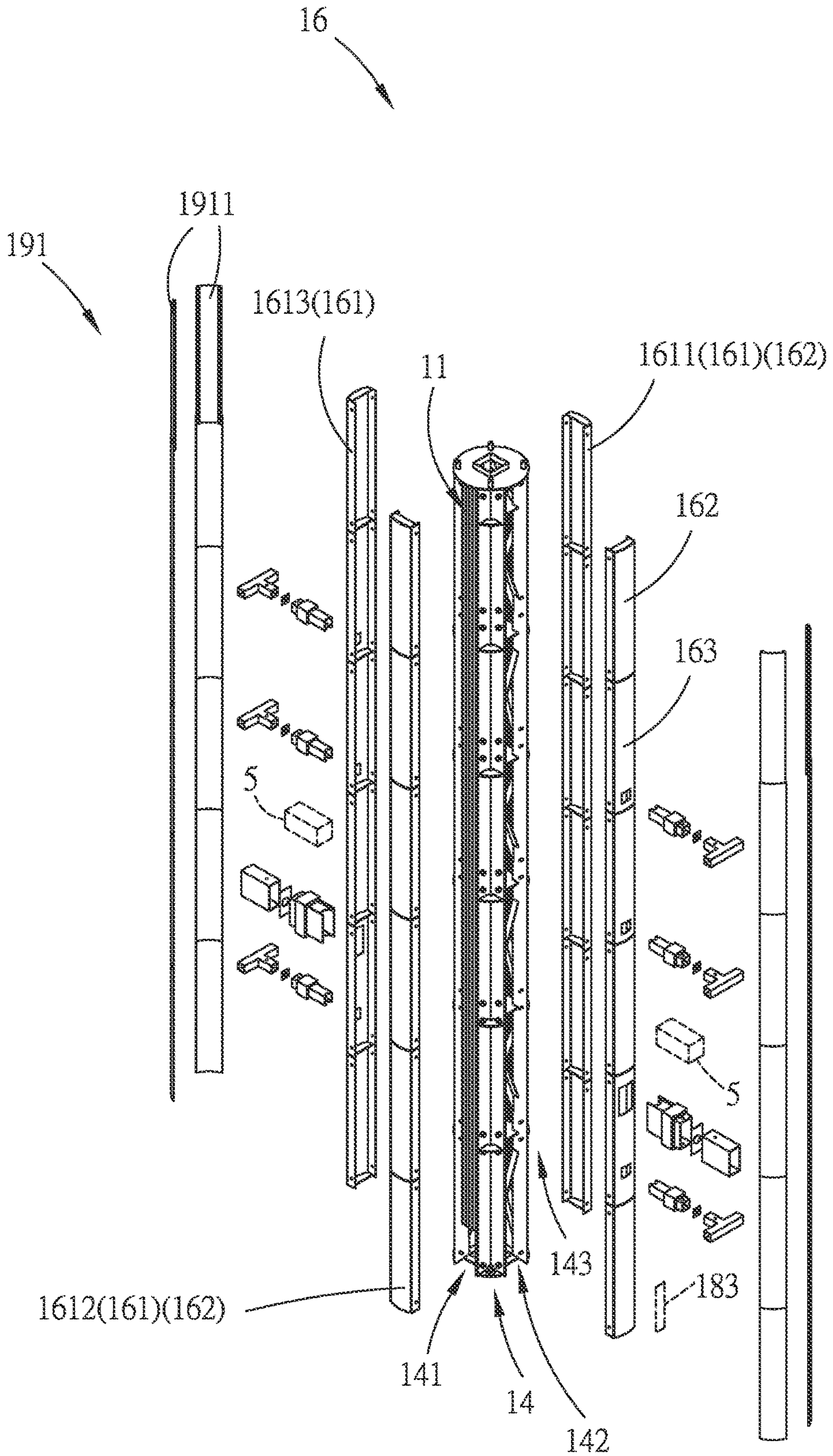
FIG. 6 is an exploded view diagram of some components of the embodiment of the combined streetlight in the present application.

As shown in FIG. 6, the combined streetlight 1 has a combined structure shielding enclosure component 191, which is installed on the pole body R to shield the combined structure of the installation structure shielding enclosure component 16 combined with the frame 14. It should be noted that with the design of the combined structure shielding enclosure component 191, the exposed appearance of the combined structure of the installation structure shielding enclosure component 16 combined with the frame 14 is avoided, ensuring aesthetics and satisfying the urban aesthetics. As shown in FIG. 1, the combined structure shielding enclosure component 191 includes a plurality of combined structure shielding enclosure 1911. These combined structure shielding enclosures 1911 can move relative to each other on the pole body R, allowing at least two of multiple combined structure shielding enclosures 1911 to partially overlap, thereby shortening the combined structure shielding enclosure component 191 to expose the combined structure of the installation structure shielding enclosure component 16 combined with the frame 14 for construction operations.

As shown in FIG. 1, the combined streetlight 1 is equipped with a flexible equipment 183, such as a flexible screen or a flexible battery. It should be clarified that the flexible equipment 183 is capable of adapting to changes in the shape of the installation structure shielding enclosure component 16 or the attached equipment 4, allowing to conform to the shape of the installation structure shielding enclosure component 16 or the attached equipment 4, enabling the flexible equipment 183 to be installed on the pole body R and meet the installation requirements of the flexible equipment 183.

As shown in FIG. 8, the cable set installation structure 141 includes the left-side cable installation substructure 1411 for arranging the left-side cable 111, the right-side cable installation substructure 1412 for arranging the right-side cable 112, and the back-side cable installation substructure 1413 for arranging the back-side cable 113. With the left-side cable installation substructure 1411, the right-side cable installation substructure 1412, and the back-side cable installation substructure 1413, the left-side cable 111, the right-side cable 112, and the back-side cable 113 can be separately arranged, avoiding entanglement between them. Correspondingly, the frame 14 has a left-side frame subcomponent 144, a right-side frame subcomponent 145, a back-side frame subcomponent 146, and a front side frame subcomponent 147. The cable set installation structure shielding enclosure 161 has a left-side cable installation structure shielding sub-enclosure 1611, a right-side cable installation structure shielding sub-enclosure 1612, and a back-side cable installation structure shielding sub-enclosure 1613.

As shown in FIG. 8, the left-side cable installation structure shielding sub-enclosure 1611 is installed to the left-side frame subcomponent 144 using, for example, a locking or a fastening method. Similarly, the right-side cable installation structure shielding sub-enclosure 1612 is installed to the right-side frame subcomponent 145 using, for example, a locking or a fastening method, and the back-side cable installation structure shielding sub-enclosure 1613 is installed to the back-side frame subcomponent 146 using, for example, a locking or a fastening method. The inner-frame equipment installation structure shielding enclosure 162 is installed to the front side frame subcomponent 147 using, for example, a locking or a fastening method. Within the pole body R, the left-side cable installation structure shielding sub-enclosure 1611 shields the left-side cable installation substructure 1411, the right-side cable installation structure shielding sub-enclosure 1612 shields the right-side cable installation substructure 1412, the back-side cable installation structure shielding sub-enclosure 1613 shields the back-side cable installation substructure 1413, and the inner-frame equipment installation structure shielding enclosure 162 shields the inner-frame equipment installation structure 142. It should be emphasized that the design of these various installation structure shielding enclosures prevents the exposure of the installation structures on the pole body R, ensuring an aesthetic appearance in line with the urban aesthetics of smart cities.

In the above-described embodiments, as shown in FIG. 1, the antenna assembly 17 is assembled above the attached equipment installation component 15 and consists of an antenna base 171, an antenna array 172, and a camouflage component 173. The antenna array 172 is positioned on the antenna base 171 to facilitate signal transmission and reception. The camouflage component 173 is also assembled on the antenna base 171 but positioned away from the location of the antenna array 172 to ensure that the camouflage component 173 does not obstruct the ability to transmit and receive signals of the antenna array 172.

As shown in FIG. 1, the antenna array 172 includes a first-layer antenna 1721, a second-layer antenna 1722, and a third-layer antenna 1723. Correspondingly, as shown in FIG. 3, the antenna base 171 comprises three layers of antenna installation structures: a first-layer antenna installation structure 1711, a second-layer antenna installation structure 1712, and a third-layer antenna installation structure 1713.

As shown in FIG. 1, the first-layer antenna installation structure 1711 positions the first-layer antenna 1721 at the first height and orientates the first-layer antenna 1721 towards the first direction for signal transmission and reception; the second-layer antenna installation structure 1712 positions the second-layer antenna 1722 at the second height and orients the second-layer antenna 1722 towards the second direction for signal transmission and reception; the third-layer antenna installation structure 1713 positions the third-layer antenna 1723 at the third height and orients the third-layer antenna 1723 towards the third direction for signal transmission and reception. It should be noted that the first height, the second height, and the third height are different, as well as the first direction, the second direction, and the third direction, allowing the antenna array 172 to provide signal transmission and reception coverage as expected. However, not limited to this, depending on the specific field conditions, as shown in FIG. 3, the first height, the second height, and the third height can be the same.

The described combined streetlight in this application can also omit certain components, not limited to the above-mentioned embodiments. For example, the combined streetlight in this application includes: a cable set, a cable routing base, an equipment cabinet, a frame, an attached equipment installation component, an installation structure shielding enclosure component, and an antenna assembly. The cable routing base provides for setting the cable set. The equipment cabinet is located above the cable routing base and is used for setting internal equipment. The frame is located above the equipment cabinet and has a cable set installation structure and an inner-frame equipment installation structure. The cable set installation structure is used for setting the cable set, while the inner-frame equipment installation structure is used for setting internal equipment. The attached equipment installation component is combined above the frame and is used for setting attached equipment. The installation structure shielding enclosure component is combined with the frame to form the pole body, and the installation structure shielding enclosure component includes a cable set installation structure shielding enclosure and an inner-frame equipment installation structure shielding enclosure. Inside the pole body, the cable set installation structure shielding enclosure provides shielding for the cable set installation structure, and the inner-frame equipment installation structure shielding enclosure provides shielding for the inner-frame equipment installation structure. The antenna assembly is combined above the attached equipment installation component and includes an antenna base and an antenna array. The antenna array is placed on the antenna base for signal transmission and reception.

In conclusion, this application provides a combined streetlight with a cable set, a cable routing base, an equipment cabinet, and a frame. Through the combined and structural design of an attached equipment installation component, an antenna assembly, and other components to meet the installation requirements of various network devices and related equipment in smart cities. Moreover, by utilizing the combined and structural design of components like an installation structure shielding enclosure component, it ensures aesthetic appeal and satisfies urban aesthetics. Therefore, the proposed combined streetlight in this application can be used in the construction of smart cities.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A combined streetlight is equipped with an internal equipment, an inner-frame equipment, and an attached equipment, and the combined streetlight including:

a cable set;

a cable routing base for providing a structure to wind the cable set;

an equipment cabinet for being located above the cable routing base and providing space for installing internal equipment;

a frame for being positioned above the equipment cabinet, with a cable set installation structure and an inner-frame equipment installation structure, and the cable set installation structure allows for the installation of the cable set, while the inner-frame equipment installation structure allows for the installation of inner-frame equipment;

an attached equipment installation component for being assembled on top of the frame and being designed to install the attached equipment;

an installation structure shielding enclosure component for being assembled on the frame, is integrated with the frame to form a pole body, and the installation structure shielding enclosure component includes a cable set installation structure shielding enclosure and an inner-frame equipment installation structure shielding enclosure, in the pole body, the cable set installation structure shielding enclosure shields the cable set installation structure, and the inner-frame equipment installation structure shielding enclosure shields the inner-frame equipment installation structure; and an antenna assembly for being assembled above the attached equipment installation component, with an antenna base and an antenna array, and the antenna array is placed on the antenna base for signal transmission and reception.

2. The combined streetlight according to claim 1, wherein the attached equipment installation component includes at least one pole insertion structure and at least one attached equipment installation pole, and the attached equipment installation pole is inserted into the pole insertion structure for installing the attached equipment.

3. The combined streetlight according to claim 1, wherein the frame is a truss.

4. The combined streetlight according to claim 1, wherein the equipment cabinet is equipped with an equipment cabinet chimney structure, which includes an equipment cabinet chimney opening and an equipment cabinet chimney wall, and the equipment cabinet chimney opening allows for the passage of the cable set, and the equipment cabinet chimney wall is positioned around the equipment cabinet chimney opening, extending upwards from the surface of the equipment cabinet to serve as a barrier to prevent liquid on the surface of the equipment cabinet from entering the equipment cabinet through the equipment cabinet chimney opening.

5. The combined streetlight according to claim 1, further including: an active cooling device, which is installed in the equipment cabinet to provide a cooling circulation and cool the internal equipment within the cabinet.

6. The combined streetlight according to claim 1, wherein the attached equipment installation component further has an attached equipment installation component chimney structure, which includes an attached equipment installation component chimney opening and an attached equipment installation component chimney wall, and the attached equipment installation component chimney opening allows for the passage of the cable set, and the attached equipment installation component chimney wall is positioned around the attached equipment installation component chimney opening, extending upwards from the surface of the attached equipment installation component to serves as a barrier to prevent liquid on the surface of the attached equipment installation component from entering the attached equipment installation component through the attached equipment installation component chimney opening.

7. The combined streetlight according to claim 1, wherein the attached equipment installation component further includes an attached equipment antenna assembly combine component and an attached equipment antenna assembly heightening component, and the attached equipment antenna assembly combine component is designed to combine the attached equipment or the antenna assembly, and the attached equipment antenna assembly heightening component is joined to the attached equipment antenna assembly combine component to provide heightening for the attached equipment antenna assembly combine component, ensuring that the height of the attached equipment or the antenna assembly meets the expected requirement; the attached equipment antenna assembly heightening component has a heightening component cabling structure, which allows the cable set to pass through, enabling the cable set to connect with the attached equipment or the antenna assembly.

8. The combined streetlight according to claim 1, further including: a frame cabling equipment and an internal cabling equipment, and the frame cabling equipment is installed in the frame and connects with the cable set, allowing the frame cabling equipment to cable for the cable set in the frame; the internal cabling equipment is installed in the equipment cabinet and connects with the cable set, allowing the internal cabling equipment to cable for the cable set in the equipment cabinet.

9. The combined streetlight according to claim 1, further equipped with an outer-frame equipment, and the frame further has an outer-frame equipment installation structure, wherein the outer-frame equipment installation structure is designed to install the outer-frame equipment, and the installation structure shielding enclosure component further includes an outer-frame equipment installation structure shielding enclosure, and in the pole body, the outer-frame equipment installation structure shielding enclosure serves to shield the outer-frame equipment installation structure.

10. The combined streetlight according to claim 9, further including: a combined structure shielding enclosure component, which is installed on the pole body to shield the combined structure that combines the installation structure shielding enclosure component with the frame.

11. The combined streetlight according to claim 10, wherein the combined structure shielding enclosure component includes a plurality of combined structure shielding enclosures, and the combined structure shielding enclosures can move relative to each other on the pole body to allow at least two of the combined structure shielding enclosures to partially overlap, shortening the combined structure shielding enclosure component, and exposes the combined structure used to combine the installation structure shielding enclosure component on the frame.

12. The combined streetlight according to claim 1, further including: an equipment cabinet liquid blocking component, and the equipment cabinet further has an equipment cabinet cabling structure, wherein the equipment cabinet cabling structure is located near the cable routing base to provide passage for the cable set, and the equipment cabinet liquid blocking component is designed to prevent the liquid of the cable routing base from flowing into the equipment cabinet through the equipment cabinet cabling structure.

13. The combined streetlight according to claim 1, wherein the antenna assembly includes a first-layer antenna, a second-layer antenna, and a third-layer antenna; the antenna base comprises a first-layer antenna installation structure, a second-layer antenna installation structure, and a third-layer antenna installation structure; the first-layer antenna installation structure positions the first-layer antenna at a first height and allows the first-layer antenna to be oriented in a first direction for signal transmission and reception; the second-layer antenna installation structure positions the second-layer antenna at a second height and allows the second-layer antenna to be oriented in a second direction for signal transmission and reception; the third-layer antenna installation structure positions the third-layer antenna at a third height and allows the third-layer antenna to be oriented in a third direction for signal transmission and reception, wherein the first height position, the second height position, and the third height position are different, and the first direction, the second direction, and the third direction are also different.

14. The combined streetlight according to claim 1, wherein the antenna array includes a first-layer antenna, a second-layer antenna, and a third-layer antenna; the antenna base includes a first-layer antenna installation structure, a second-layer antenna installation structure, and a third-layer antenna installation structure; the first-layer antenna installation structure positions the first-layer antenna at a first height and allows the first-layer antenna to be oriented in a first direction for signal transmission and reception; the second-layer antenna installation structure positions the second-layer antenna at a second height and allows the second-layer antenna to be oriented in a second direction for signal transmission and reception; the third-layer antenna installation structure positions the third-layer antenna at a third height and allows the third-layer antenna to be oriented in a third direction for signal transmission and reception, wherein the first height position, the second height position, and the third height position are the same, and the first direction, the second direction, and the third direction are different.

15. The combined streetlight according to claim 1, wherein the antenna assembly further includes a camouflage component, which is assembled onto the antenna base, and the camouflage component is positioned on the antenna base to avoid obstructing the position of the antenna assembly, preventing the camouflage component from blocking the signal transmission and reception of the antenna assembly.

16. The combined streetlight according to claim 1, wherein the cable set includes a left-side cable, a right-side cable, and a back-side cable, the frame comprises a left-side frame substructure, a right-side frame substructure, and a back-side frame substructure, and the cable set installation structure shielding enclosure includes a left-side cable installation structure shielding sub-enclosure, a right-side cable installation structure shielding sub-enclosure, and a back-side cable installation structure shielding sub-enclosure, wherein the cable set installation structure includes a left-side cable installation substructure, a right-side cable installation substructure, and a back-side cable installation substructure; the left-side cable installation substructure is for installing the left-side cable, the right-side cable installation substructure is for installing the right-side cable, and the back-side cable installation substructure is for installing the back-side cable; the left-side cable installation structure shielding sub-enclosure is assembled to the left-side frame substructure, the right-side cable installation structure shielding sub-enclosure is assembled to the right-side frame substructure, and the back-side cable installation structure shielding sub-enclosure is assembled to the back-side frame substructure; within the pole body, the left-side cable installation structure shielding sub-enclosure conceals the left-side cable installation substructure, the right-side cable installation structure shielding sub-enclosure conceals the right-side cable installation substructure, and the back-side cable installation structure shielding sub-enclosure conceals the back-side cable installation substructure.

17. The combined streetlight according to claim 1, wherein the frame further includes a front-side frame substructure, and the inner-frame equipment installation structure shielding enclosure is assembled to the front-side frame substructure.

18. The combined streetlight according to claim 1, further including: a flexible equipment, which can adapt to the deformation of the installation structure shielding enclosure or the attached equipment, and fit snugly with the installation structure shielding enclosure or the attached equipment.

19. The combined streetlight according to claim 1, wherein the inner-frame equipment installation structure is a track-type equipment installation structure, and the track-type equipment installation structure is used to install the inner-frame equipment.

20. The combined streetlight according to claim 1, wherein the frame has a frame chimney structure, which includes a frame chimney opening and a frame chimney wall, wherein the frame chimney opening provides a passage for the cable set, and the frame chimney wall is positioned around the frame chimney opening and extends upwards from the surface of the frame, providing a barrier to prevent liquid on the surface of the frame from entering the frame through the frame chimney opening.

* * * * *